US007072664B2

(12) United States Patent
Luss et al.

(10) Patent No.: US 7,072,664 B2
(45) Date of Patent: Jul. 4, 2006

(54) ESTIMATING NON-UNIFORM SPATIAL OFFERED LOADS IN A CELLULAR WIRELESS NETWORK

(75) Inventors: Hanan Luss, Marlboro, NJ (US); Ashok Ranade, Warren, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 214 days.

(21) Appl. No.: 10/756,629

(22) Filed: Jan. 13, 2004

(65) Prior Publication Data

US 2005/0153704 A1 Jul. 14, 2005

(51) Int. Cl.
*H04Q 7/20* (2006.01)
(52) U.S. Cl. .................. 455/453; 455/452.1; 455/422.1
(58) Field of Classification Search ................ 455/453, 455/452.1, 452.2, 422.1, 423, 424, 525, 62
See application file for complete search history.

(56) References Cited

U.S. PATENT DOCUMENTS 6,094,580 A * 7/2000 Yu et al. ..................... 455/446

OTHER PUBLICATIONS

K.I. Aardal, et al., "Models and Solution Techniques for Frequency Assignment Problems," Konrad-Zuse-Zentrum fur Informationstechnik Berlin (ZIB), ZIB Report 01-40, Dec. 2001, pp. 1-59.
J.M Bourjolly, et al., "Canadian Telecom Makes the Right Call," OR/MS Today, Apr. 2002, pp. 40-44.
H. Luss, "On Equitable Resource Allocation Problems: A Lexicographic Minimax Approach," Operations Research, vol. 47, No. 3, May-Jun. 1999, pp. 361-378.
H. Luss, et al., "Resource Allocation Among Competing Activities: A Lexicographic Minimax Approach," Operations Research Letters, vol. 5, No. 5, Nov. 1986, pp. 227-231.
H. Luss, et al., "A Resource Allocation Approach for the Generation of Service -Dependent Demand Matrices for Communications Networks," Telecommunication Systems, 2001, 17:4, pp. 411-433.
W. Stallings, "Wireless Communications and Networking," Prentice Hall, 2002, pp. 283-337.

* cited by examiner

*Primary Examiner*—Melur Ramakrishnaiah
(74) *Attorney, Agent, or Firm*—Glen Farbanish; Joseph Giordano

(57) ABSTRACT

Non-uniform spatial loads are estimated for a plurality of bins corresponding to a cellular wireless territory served by Base Station Transceivers (BTS's). Using means and standard deviation of signal strength received at each of the bins from each of the BTS's, probabilities are computed for each bin such that each of the BTS's will serve the bin. Using the computed probabilities and an estimated offered load for each BTS, which load is derived from carried load and call lost measurements at the BTS, a resource constraint is then expressed for each BDS in terms of the bin offered load estimates. Next, using an approximation of relative demand for wireless services across all bins, based, for example, on demographic data, a performance function is expressed for each bin in terms of the bin's estimated offered load. Using the performance function a lexicographic minimax objective function is defined, which is then coupled with the resource constraints to express an equitable resource allocation model. Finally, the optimal solution to the model is determined thereby providing the bin offered load estimates.

15 Claims, 1 Drawing Sheet

ESTIMATING NON-UNIFORM SPATIAL OFFERED LOADS IN A CELLULAR WIRELESS NETWORK

FIELD OF THE INVENTION

Our invention relates generally to cellular wireless networks. More particularly, our invention relates to methods for estimating non-uniform spatial offered loads generated throughout a service territory associated with the network.

DESCRIPTION OF THE BACKGROUND

Today, cellular wireless carriers primarily use second-generation cellular systems to provide cellular communications. The most widely used systems are the global system for mobile communications (GSM), which uses a hierarchy of time division multiplexing access (TDMA) frames, and code division multiple access (CDMA), which is a spread spectrum-based technique. In addition, significant work is underway on the development of third-generation wireless communications systems.

Regardless of the technology used, cellular carriers provide wireless services by partitioning their service territories into cells. Ideally, a cell is in the shape of a hexagon; however, in practice, topological limitations and other considerations lead to significant variations in a cell's topology. Each cell may be further partitioned into a few (e.g., 3 or 6) cell sectors. Every cell sector has a Base Transceiver Station (BTS) with multiple transceivers that transmit and receive signals at multiple frequencies. Thus, the BTS serves as a mobile station's access point into the communications network.

Designing and operating a wireless cellular network is quite complex. One approach a carrier typically uses to mange its network is to partition its service territory into small "bins" (also called pixels) and to evaluate the service quality at each bin. For example, a 50-kilometer by 50-kilometer service territory can be partitioned into more than 60,000 bins of 200 meters by 200 meters. Using propagation models and field measurements, a carrier then derives the mean and standard deviation of the signal strength received at every bin from every BTS. The matrix of the expected signal strengths among all bin-BTS combinations is known as the Received Signal Strength Indicator (RSSI) matrix. A carrier uses this matrix to determine if a mobile station in a particular bin is being adequately served. In particular, multiple BTS's may adequately serve a mobile station in a particular bin. Typically (e.g., in GSM), the BTS that transmits the strongest signal to the mobile location serves the mobile station. Alternatively (e.g., in CDMA), multiple BTS's that transmit the strongest signals to the mobile location may serve the mobile station simultaneously. A mobile station in a specific bin is served well if the ratio of the carrier signal strength to that of the sum of the interfering signal strengths is above a certain threshold.

A carrier also continuously collects performance data at every BTS, including data regarding the carried load, blocked calls, dropped calls, quality of connections, etc. From this information, the carrier attempts to infer the service provided to different bins in the territory.

However, carriers today do not know the offered load (represented, for example, in units of bits per second, number of time slots per second, minutes of call per minute, etc.) generated at individual bins at different hours of the day. Knowing each bin's offered load would better facilitate the carrier's planning and operational processes. In particular, knowing the offered load at each bin would allow the carrier to better manage network resources and to provide better service to those bins with higher loads by allowing more intelligent assignment of frequencies among the BTS's and by facilitating load balancing across the BTS's through the fine-tuning of different control parameters.

More specifically, a fundamental problem with many of today's cellular network technologies (e.g., in GSM) is the assignment of frequencies among the BTS's. The total number of available frequencies is limited so that each frequency must be assigned to multiple BTS's. However, the assignment of a given frequency across multiple BTS's must be done so that the mobile stations experience negligible interference. For example, Karen I. Aardal, Stan P. M. Van Hoesel, Arie M. C. A. Koster, Carlo Mannino, and Antonio Sassano present in the paper "Models and Solution Techniques for Frequency Assignment Problems," that appeared as a report of Zentrum fur Informationstechnik Berlin (ZIB), ZIB Report 01-40, December 2001 a survey on frequency assignment models and algorithms, which paper is hereby incorporated by reference. As the authors describe, the models/algorithms use an aggregation of the bins to cell sectors and use as input a representative expected signal strength received at every BTS from every other BTS. However, frequency assignment models and algorithms would be improved by assigning weights to the bins wherein these weights are set equal to the bin estimated offered loads. In addition, Jean-Marie Bourjolly, Leslie Dejoie, Ke Ding, Oumar Dioume, and Michel Lominy emphasize in their paper "Canadian Telecom Makes the Right Call, Frequency Allocation in Cellular Phone Networks: an OR Success Story," OR/MS Today, 29, 40–44, April 2002 that the resulting frequency plan should be evaluated at the bin level rather than at the BTS level with the objective of minimizing, for example, the number of bins with unacceptable reception quality. Knowing the bins that generate higher offered loads would allow a carrier to spend more resources and thereby provide better service to bins that generate more demand.

BTS load management is also an important issue in order to avoid uneven congestion and blocking of call attempts. Carriers can, for example, adjust the transmission power from specific BTS's and thus change the area served by each of the BTS's. By reducing a certain BTS's transmission power, some of the bins that this BTS previously served will now receive a stronger signal from other BTS's, which will now serve those bins. Thus, the fine-tuning of the power parameters at a BTS is used to balance loads among the BTS'S. Any load-balancing scheme that takes into consideration the loads generated at each bin would more effectively fine-tune the power parameters.

SUMMARY OF OUR INVENTION

Accordingly, it is desirable to provide methods that overcome the shortcomings of the prior art and estimate non-uniform spatial offered loads over a wireless service territory of interest in a cellular carrier's network. Our method uses as input a partition of the service territory into a plurality of logical bins, the mean and standard deviation of the signal strength received at every bin from every BTS in the service territory, an offered load estimate for each Base Station Transceiver (BTS) that serves the service territory, and an approximation of relative demand for wireless services across the bins in the service territory. As output, our method provides estimates of the offered loads for each of the bins in the service territory of interest.

More specifically, the mean and standard deviation of the signal strength received at every bin from each of the BTS' are first determined using measurements and known propagation models. Treating the received signal strength at a given bin from a given BTS as a random variable, probability density functions and cumulative distribution functions are defined for each bin across each BTS using the determined means and standard deviations. Based on the defined functions, probabilities are derived for each bin across each BTS, indicating the probability a given BTS will serve a given bin. Each of these probabilities is then computed.

Next, an estimate of the offered load for each BTS is determined using measurements of carried load and lost calls at the BTS. Using these BTS offered loads and the computed probabilities, a resource constraint is expressed for each BTS in terms of the bin offered loads that our method determines.

The last input to our method is an approximation of the relative demand for wireless services across the bins in the service territory. These relative demands are obtained from demographic data, such as information on residence density, business density, and traffic patterns, and are obtained independently of BTS load measurements. These relative demands are converted to demand targets such that the sum of the demand targets across all the bins equals the sum of the BTS estimated offered loads across all the BTS's. Using these demand targets, a performance function is then defined for each bin in terms of the bin's offered load that is to be determined.

Once having the BTS resource constraints and the performance functions, an equitable resource allocation model is generated, wherein the model is formulated as a lexicographic minimax optimization problem with decision variables that represent the estimated non-uniform spatial offered loads for each bin. Specifically a lexicographic minimax objective function is defined in terms of lexicographic minimization of the vector of the performance functions sorted in a non-increasing order. This objective function is then coupled with the resource constraints to define the model. Using known algorithms, the model is finally solved thereby finding the set of estimated bin offered loads that both results in the lexicographic smallest vector of performance functions sorted in a non-increasing order and that satisfies the resource constraints.

Significantly, a carrier can use the estimated bin offered loads as bin weights for performing frequency assignment across all BTS's. Also, a carrier can use the estimated bin offered loads to identify the bins with higher offered loads. Knowledge of the bins with higher offered loads allows a carrier to improve the service provided to these bins. Furthermore, a carrier can use this knowledge of the bin offered loads to balance the loads imposed on the BTS's in the service territory in a more effective way, for example, by a more effective adjustment of the signals power parameters.

DETAILED DESCRIPTION OF OUR INVENTION

Figure 1:
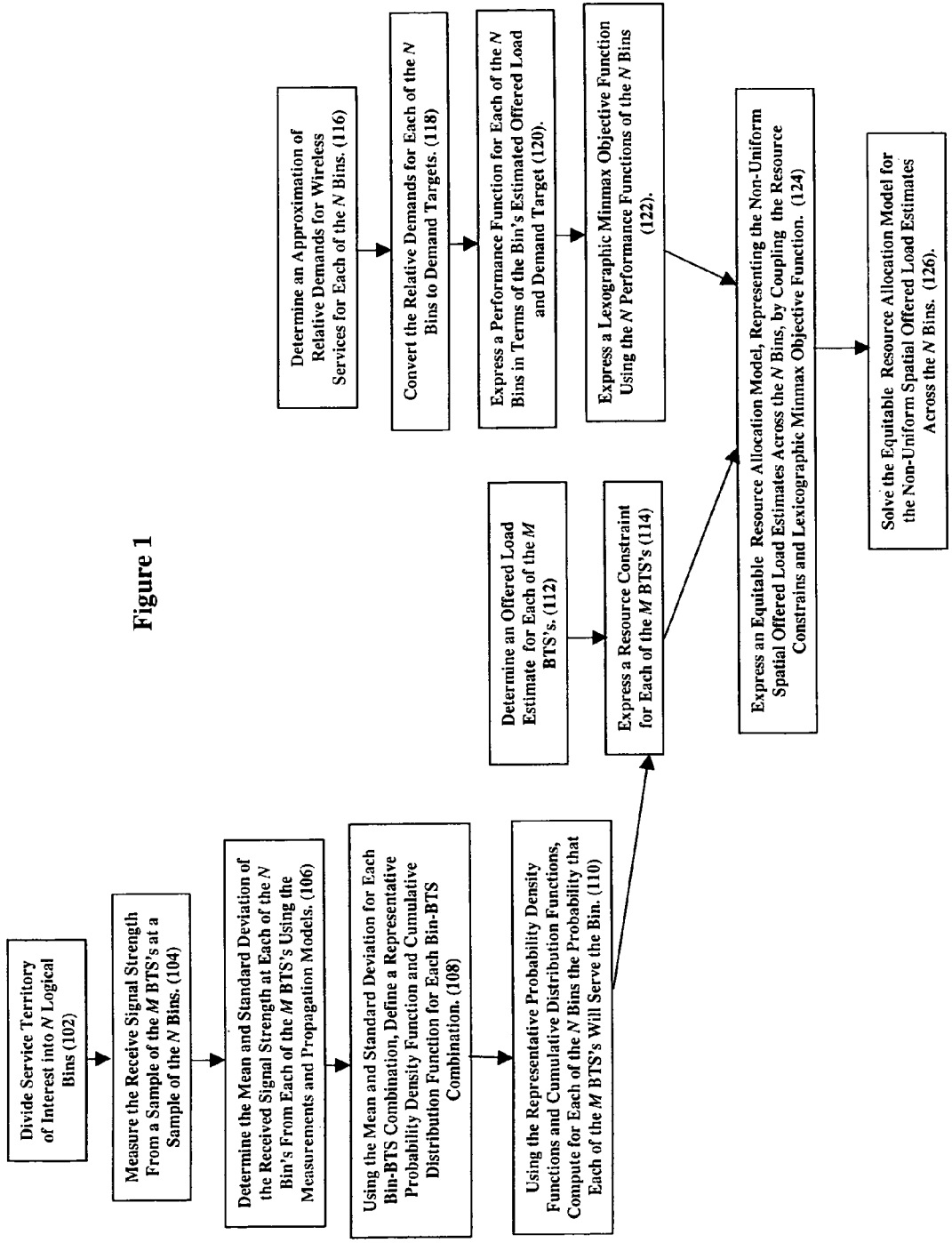
FIG. 1 depicts the method steps of one illustrative embodiment of our invention for estimating the non-uniform spatial offered loads over the bins of a cellular wireless service territory.

FIG. 1 is a flow chart depicting the method steps of our invention for estimating the non-uniform spatial offered loads over a service territory of interest in a carrier's cellular wireless network over a specific time period. Beginning with step 102, the carrier's service territory, or a portion of this territory of interest, is divided into logical bins. For description purposes, these bins can be numbered 1 through N (i.e., N is the number of bins in the service territory of interest). The exact number of bins and the geographic size of each bin are not specific to our invention.

A first input to our method is the mean and standard deviation of the signal strength received at every bin from every BTS in the service territory of interest. For description purposes, the BTS's in the service territory of interest can be numbered 1 through M (i.e., M is the number of BTS's in the service territory of interest). Accordingly, in step 104, physical test measurements are made at a sample of the N bins wherein each measurement is the received signal strength from a sample of the M BTS's. These sample measurements are correspondingly used to infer the received signal strength among all bin-BTS combinations. Using these measurements and known propagation models (see, for example, Chapter 10 of William Stallings, "Wireless Communications and Networking", Prentice Hall, 2002 for propagation models), in step 106 the mean $\mu_{ij}$ and standard deviation $\sigma_{ij}$ of the received signal strength at each bin j for all j=1 to N across each BTS i for all for i=1 to M is then determined.

The received signal strength at any given bin j (for j=1 to N) from any given BTS i (for i=1 to M) is a random variable and can be represented by a probability density function $f_{ij}(s)$. As such, proceeding to step 108, using the mean $\mu_{ij}$ and standard deviation $\sigma_{ij}$ of the received signal strength, a probability density function $f_{ij}(s)$ is defined for each bin j for all j=1 to N across each BTS i for all i=1 to M, where $f_{ij}(s)$ is the density function for the signal strength s that bin j receives from BTS i. Note that in wireless propagation models, signal strengths are typically expressed in dBm (decibel-miliWatt), which is a logarithmic scale. As such, the signal strengths are typically modeled as random variables with log-normal density functions. Accordingly, when the signal strength is expressed in dBm, each $f_{ij}(s)$ is typically a normal distribution with mean $\mu_{ij}$ and standard deviation $\sigma_{ij}$. Nonetheless, it should be noted that our method is independent of the actual density function assumed for the signal strength. Having $f_{ij}(s)$, the cumulative distribution function $F_{ij}(S)$ can also be defined for all j=1 to N across each BTS i for all for i=1 to M, where $F_{ij}(S)$ is the probability that the signal strength received at bin i from BTS j does not exceed S.

Proceeding to step 110, $f_{ij}(s)$ and $F_{ij}(S)$ are used to compute $p_{ij}$ for each bin j for all j=1 to N across each BTS i for all i=1 to M, where $p_{ij}$ represents the probability that BTS i will serve bin j or, in other words, represents the probability that a mobile station in bin j is served by BTS i. In particular, the derivation of $p_{ij}$ is based on assumptions underlying the wireless technology covering the service territory of interest. Accordingly, as these assumptions change, $p_{ij}$ should be modified. For example, in multiple technologies, such as GSM, it is reasonable to assume that the BTS that provides the strongest received signal to a given bin serves any given mobile station within that bin and that each of the signal strengths received from the M BTS's within the bin are independent random variables. From these assumptions, $p_{ij}$ can be expressed as shown in equation (1):

$$p_{ij} = \int_s f_{ij}(s) \left[ \prod_{\forall k, k \neq i} F_{kj}(s) \right] ds \quad (1)$$

for i=1, 2, ..., M and j=1, 2, ..., N. In practice, we set probabilities $p_{ij}$ to zero if the mean signal strength received at bin j from BTS i is, for example, 18 decibels below the largest mean signal received at bin j (which implies that the signal is, on average, only about 1.5% of the strongest signal). Once defining the probabilities $p_{ij}$ as expressed in equation (1), for example, the probabilities are computed using numerical integration methods. Finally, the positive probabilities for each bin j are normalized to a sum of one.

As a second example, in cellular wireless technologies such as CDMA systems, the up to C (where C≧1) BTS's that provide the strongest received signals to a given mobile station in a given bin can simultaneously serve that mobile station. Here, the probability $g_{ijl}$ must be determined, wherein $g_{ijl}$ is the probability that bin j receives its l-th strongest signal from BTS i for all i=1 to M, j=1 to N, and l=1 to C. Accordingly, let B(j) be the subset of BTS's that are the candidate BTS's for serving the mobile stations in bin j (e.g., B(j) may include all BTS's that produce mean signals to bin j that are within 18 decibels of the strongest mean signal.). In addition, let B denote a subset of {B(j)−i} with l−1 elements. Then equation (2a) represents the probability for each bin j across each BTS i that the strongest signal bin j receives comes from BTS i:

$$g_{ij1} = \int_s f_{ij}(s) \left[ \prod_{\forall k, k \neq i} F_{kj}(s) \right] ds \quad (2a)$$

for i=1, 2, ..., M and j=1, 2, ..., N. In addition, equation (2b) represents the probability for each bin j across each BTS i for each of the remaining C−1 strongest signals that this signal at bin j comes from BTS i:

$$g_{ijl} = \sum_{B: B \subseteq B(j)} \int_s f_{ij}(s) \prod_{k \in B} [1 - F_{kj}(s)] \prod_{k \in B(j)-B-i} F_{kj}(s) ds \quad (2b)$$

for i=1, 2, ..., M, j=1, 2, ..., N, and l=2, 3, ..., C. Once $g_{ij1}$ and $g_{ijl}$ for l=2, 3, ..., C are derived, the probabilities $p_{ij}$ can be expressed as shown in equation (3):

$$p_{ij} = \sum_{l=1}^{C} g_{ijl} \quad (3)$$

for i=1, 2, ..., M, and j=1, 2, ..., N. Once defining the probabilities $g_{ijl}$ as expressed, for example, in equations (2a)–(2b), the probabilities $p_{ij}$ are computed using numerical integration methods. In practice, we set probabilities $p_{ij}$ to zero if the mean signal strength received at bin j from BTS i is, for example, 18 decibels below the largest mean signal received at bin j. Finally, the positive probabilities $p_{ij}$ for each bin j are normalized to a sum of one.

A second input to our method is an offered load estimate for each BTS in the service territory of interest, which loads are determined in step 112. In particular, the offered load estimate $L_i$ is estimated for each BTS i for all i=1 to M using carried load measurements and information regarding lost calls at each BTS i over the time period of interest (note that the carried load is defined as the offered load multiplied by the proportion of calls that are not lost).

Using these offered load estimates $L_i$ and the probabilities $p_{ij}$ determined in step 110, a resource constraint is expressed in step 114 for each BTS i for all i=1 to M. In particular, let $x_j$ represent the estimated offered load at bin j for all j=1 to N (i.e., $x_j$ for all j=1 to N are the non-uniform spatial offered loads our method ultimately estimates). The offered load for a given BTS i can be computed using the estimated bin offered loads $x_j$ and the probabilities $p_{ij}$ as shown in expression (4):

$$\sum_{j=1}^{N} p_{ij} x_j \quad (4)$$

for i=1, 2, ..., M. Importantly, the computed offered load at a given BTS i as shown in expression (4) cannot exceed the estimated offered load $L_i$ for BTS i as determined in step 112. Accordingly, inequality (5) represents a resource constraint expression for any given BTS i for i=1, 2, ..., M:

$$\sum_{j=1}^{N} p_{ij} x_j \leq L_i \quad (5)$$

In other words, inequalities (5) are constraints on the non-uniform spatial estimated offered loads $x_j$ at bin j for all j=1 to N that our method ultimately estimates. Specifically, the set of constraints for i=1, 2, ..., M ensures that all estimated bin offered loads are such that the total computed offered load at any specific BTS i (as a function of the estimated bin offered loads) does not exceed that BTS's offered load estimate $L_i$.

A third input to our method is an approximation of relative demands for wireless services across the bins in the service territory of interest, which demands are determined in step 116. In particular, a relative demand estimate is determined for each bin j for all j=1 to N. As an example, demographic data corresponding to the time period of interest can be used to determine the relative demand estimates for wireless services. Such data includes information on residence density, business density, and traffic patterns. Internal marketing organizations and wireless services industry consultants can provide these approximations. Note that the relative demands are independent of the load measurements at the BTS's.

Proceeding to step 118, the relative demand estimate for each bin j for all j=1 to N is converted to a demand target $e_j$. In particular, each relative demand estimate is proportionally adjusted so that the sum of the demands over all N bins is equal to the sum of the measured offered loads $L_i$ over all M BTS's as shown in equation (6).

$$\sum_{j=1}^{N} e_j = \sum_{i=1}^{M} L_i \quad (6)$$

In step 120, the demand targets $e_j$ are used to express a performance function $h_j(x_j)$ for each bin j for all j=1 to N. As shown by equation (7), each performance function $h_j(x_j)$ for a given bin j measures the weighted normalized deviation of the bin's estimated offered load $x_j$ from the bin's demand target $e_j$.

$$h_j(x_j) = w_j \frac{e_j - x_j}{e_j} \quad (7)$$

for all j=1, 2, ..., N and where the weights $w_j > 0$. Note that $h_j(x_j)$ is strictly decreasing with $x_j$. In most cases, each of the weights $w_j$ are set to one, which implies that the performance functions represent normalized deviations from the demand targets. When $w_j = e_j$, for all j, the performance functions represent deviations from demand targets. Our method can handle any selected weights.

Once having the resource constraint expression for each of the M BTS's as determined in step 114 and as shown in inequality (5) and the performance function $h_j(x_j)$ as determined in step 120 and as shown in equation (7), an equitable resource allocation model is generated, wherein the model is formulated as a lexicographic minimax optimization problem with decision variables that represent the estimated non-uniform spatial offered loads $x_j$ for all j=1 to N for the bins in the service territory of interest. The optimal solution to the model provides the offered load estimate $x_j$ for each of the N bins within the service area.

Specifically, proceeding to step 122, the performance functions $h_j(x_j)$ for each of the N bins are used to express a lexicographic minimax objective function, which, when coupled with the resource constraints (5), form an equitable resource allocation model. Specifically, this model is defined as an allocation of "available resources" (i.e., offered load estimates at the BTS's) such that no performance function value $h_n(x_n)$ for a given bin n can be decreased further without either violating at least one of the resource constraints (5) or without increasing the performance function value $h_k(x_k)$ of another bin k wherein $h_k(x_k)$ is at least as large as $h_n(x_n)$ for all n and k=1 to N. Since the performance functions are strictly decreasing, an equivalent way of defining the equitable resource allocation model is that no estimated offered load $x_n$ for a given bin n can be increased without either violating at least one of the resource constraints (5) or without decreasing another estimated offered load $x_k$ at a given bin k that has a performance function value $h_k(x_k)$ that is at least as large as $h_n(x_n)$.

Accordingly, let x be a vector of the N estimated offered loads $x_j$ and let $h^N(x)$ be a vector of the N performance functions $h_j(x_j)$ for j=1 to N, where these performance functions are sorted in non-increasing order as shown in formulation (8a) and (8b).

$$h^N(x) = [h_{j_1}(x_{j_1}), h_{j_2}(x_{j_2}), \ldots, h_{j_N}(x_{j_N})] \quad (8a)$$

where, $$h_{j_1}(x_{j_1}) \geq h_{j_2}(x_{j_2}) \geq \ldots \geq h_{j_N}(x_{j_N}) \quad (8b)$$

The lexicographic minimax objective function of the equitable resource allocation model consists of finding the lexicographic smallest vector $h^N(x)$. Letting $x^l$ be the vector $x \geq 0$ of estimated non-uniform spatial offered loads across the N bins that results in the lexicographic smallest vector $h^N(x)$ among all vectors $x \geq 0$, the lexicographic minimax objective function can be expressed as shown in equation (9).

$$h^N(x^l) = \operatorname*{lexmin}_x [h^N(x)] \quad (9)$$

among all vectors $x \geq 0$.

Proceeding to step 124, the equitable resource allocation model is expressed by coupling the resource constraints (5) with the lexicographic minimax objective function of equation (9). This model is formulated by (10a)–(10c).

$$h^N(x^l) = \operatorname*{lexmin}_x [h^N(x)] \quad (10a)$$

$$\sum_{j=1}^{N} p_{ij} x_j \leq L_i \quad \text{for } i = 1, 2, \ldots, M \quad (10b)$$

$$x_j \geq 0 \text{ for } i=1, 2, \ldots, M \text{ and } j=1, 2, \ldots, N \quad (10c)$$

Objective function (10a) minimizes lexicographically the vector $h^N(x)$, where $h_j(x_j)$ is given by equation (7) and $h^N(x)$ is defined by (8a)–(8b). Constraints (10b) ensure that the sum of the estimated offered loads at all bins, multiplied by the appropriate probabilities, does not exceed the offered load estimated at each of the M BTS's. Constraints (10c) ensure that all estimated loads are nonnegative. The optimal solution to the model as formulated by (10a)–(10c) is such that no performance function value $h_j(x_j)$ can be feasibly decreased without increasing the value of another performance function value that is at least as large.

The elements $x_j^l$ of the vector $x^l$ that provides the optimal solution to the model formulated by (10a)–(10c) are the non-uniform spatial offered load estimates $x_j$ for each bin j for j=1 to N within the service territory of interest over the time period of interest. The vector $x^l$ is an equitable allocation of the offered load estimates at the BTS's among the N bins, since no estimated offered load $x_n$ for a given bin n can be feasibly increased without decreasing another estimated offered load $x_k$ at a given bin k that has a performance function value $h_k(x_k)$ that is at least as large as $h_n(x_n)$.

Proceeding to step 126, the optimal solution $x^l$ to the equitable resource allocation model formulated by (10a)–(10c) is determined, thereby providing the offered load estimates $x_j$ for each of the N bins within the service territory of interest. In particular, Hanan Luss in, "On Equitable Resource Allocation Problems: A Lexicographic Minimax Approach," *Operations Research*, 47, pages 361–378, 1999 (hereinafter "Luss"), presents in Section 2 several variations of algorithms for solving the model as formulated by (10a)–(10c) using today's desktop computers, which paper is hereby incorporated by reference. In addition, Hanan Luss and Andrew Vakhutinsky in, "A Resource Allocation Approach for the Generation of Service-Dependent Demand Matrices for Communications Networks," *Telecommunication Systems*, 17, pages 411–433, 2001, present an adaptation of an algorithm to solve a model for determining service-dependent point-to-point demands in wire-line networks and further present computational results for large networks. Nevertheless, it should be noted that our invention is independent of the exact algorithm used to solve the equitable resource allocation model as formulated by (10a)–(10c).

In general, an algorithm for finding the optimal solution to the equitable resource allocation model, as formulated by (10a)–(10c), repeatedly solves minimax models. Upon each minimax solution, some variables are fixed at their lexicographic minimax values and excluded from the model, and the amount of available resources is updated. Eventually, all variables are fixed at their lexicographic minimax values, thus representing the equitable resource allocation solution.

More specifically, let I denote a set of BTS's and J denote a set of bins. Initially, I={1, 2, . . . , M} and J={1, 2, . . . , N}. We assume that the input parameters to our method are cleaned-up so that $L_i > 0$ for all i∈I, so that for each i∈I, $p_{ij} > 0$ for some j∈J, and so that for each j∈J, $p_{ij} > 0$ for some i∈I. The initial minimax model to be solved is formulated by (11a)–(11c):

$$V^* = \min_x \left[ \max_j h_j(x_j) \right] \quad (11a)$$

$$\sum_{j=1}^{N} P_{ij} x_j \leq L_i, \, i \in I \quad (11b)$$

$$x_j \geq 0, \, j \in J \quad (11c)$$

It is important to note that the model as formulated by (11a)–(11c) may have multiple optimal solutions. Accordingly, as part of an algorithm for solving the model as formulated by (11a)–(11c), we need to compute the minimal minimax solution vector x*. Note that x* is the "minimal minimax solution" to the model formulated by (11a)–(11c) if x*≦x', where x' is any other minimax solution to the model formulated by (11a)–(11c).

What follows is an outline of one variation of the above-mentioned algorithms for solving the equitable resource allocation model as formulated by (10a)–(10c). As indicated, these algorithms include the step of computing the "minimal minimax solution" vector x* for the model as formulated by (11a)–(11c). Accordingly, an outline of one variation of an algorithm for computing this vector x* is first presented. Note that this particular algorithm for computing the "minimal minimax solution" vector x* is described in "Luss" and in Hanan Luss and Donald R. Smith, "Resource Allocation Among competing Activities: A Lexicographic Minimax approach," *Operations Research letters*, 5, pages 227–231, 1986, which paper is also hereby incorporated by reference. Again note that our invention is independent of the exact algorithm used to solve the equitable resource allocation model as formulated by (10a)–(10c) and of the exact algorithm used to compute the "minimal minimax solution" for the model formulated by (11a)–(11c).

Exemplary Algorithm for Computing the "Minimal Minimax Solution" Vector x* for the Model as Formulated by (11a)–(11c)

1. Initialize temporary sets JTEMP=J and ITEMP=I.
2. Compute equation (12).

$$V_i = \frac{\sum_{j \in JTEMP} P_{ij} e_j - L_i}{\sum_{j \in JTEMP} P_{ij} e_j / w_j}, \, i \in ITEMP \quad (12)$$

3. Find the solution to the relaxed minimax problem (i.e., without constraints (11c)) as shown in equation (13):

$$V^R = \max_{i \in ITEMP} [V_i] \quad (13)$$

4. If $w_j \geq V^R$ for all j∈JTEMP, then proceed to Step (6) below; otherwise, exclude from JTEMP any j∈JTEMP for which $w_j < V^R$.
5. Update expressions $V_i$ as given by equation (12), for all i∈ITEMP, by subtracting from the summations those terms that correspond to the j's that were deleted from JTEMP in Step (4). Delete any constraint i∈ITEMP for which all j with $p_{ij} > 0$ were deleted from JTEMP. Return to Step (3).
6. Record the minimal minimax solution as shown by equations (14a)–(14b) and stop.

$$V^* = V^R \quad (14a)$$

$$x_j^* = \max[h_j^{-1}(V^*), 0] = \max[e_j(1 - V^*/w_j), 0], \, j \in J \quad (14b)$$

Note that if the $w_j$'s are all the same, then, in Step (4), $w^j \geq V^R$ for all j∈JTEMP in the first iteration. In this case, Step (4) implies that the algorithm finds the minimal minimax solution in a single iteration.

Exemplary Algorithm for Solving the Equitable Resource Allocation Model as Formulated by (10a)–(10c)

1. Formulate the minimax model as represented by equations (11a)–(11c) with sets I and J and loads $L_i$.
2. Compute the minimal minimax solution to the model represented by equations (11a)–(11c) using the above described six step "minimal minimax solution" algorithm (or any other algorithm that provides the minimal minimax solution). The minimal minimax solution is given by equations (14a)–(14b). Identify the set R0={i: i∈ITEMP and $V_i = V^*$}. These are resource constraints that are fully used.
3. Identify set JFIX={j: $p_{ij} > 0$ for some i∈R0}. Fix $x_j^I = x_j^*$ for all j∈JFIX.
4. Delete from J all j∈JFIX. If J is now empty, stop; the equitable resource allocation solution has been obtained. If J is not empty, continue with Step (5).
5. Delete i from I if all j with $p_{ij} > 0$ were deleted from J. Update the loads $$L_i \leftarrow L_i - \sum_{j \in JFIX} p_{ij} x_j^I$$

for all i∈I. Return to Step (2).

As indicated, the bin offered load estimates can be used as weights for the bins wherein these weights would be used to improve frequency allocation models and algorithms. Also, once having the offered load estimate for each bin, a carrier can identify the bins with higher offered loads. Knowledge of the bins with higher offered loads allows a carrier to improve the service provided to these bins by modifying the frequency assignment plan across the BTS's. Furthermore, a carrier can use this knowledge of the bin offered loads to balance the loads imposed on the BTS's in the service territory in a more effective way.

As an example of our method, consider a cellular network service territory of interest divided into N=6 bins with M=3 BTS's. Assume the normalized probabilities, $p_{ij}$, determined from steps 104–110 for each of the six bins across each of the three BTS's is as shown in Table 1:

TABLE 1

|  | BTS 1 | BTS 2 | BTS 3 |
|---|---|---|---|
| Bin 1 | 0.5 | 0.5 | 0 |
| Bin 2 | 0 | 0.5 | 0.5 |
| Bin 3 | 0.5 | 0 | 0.5 |
| Bin 4 | 0.2 | 0 | 0.8 |
| Bin 5 | 0.2 | 0.8 | 0 |
| Bin 6 | 0 | 0.2 | 0.8 |

Assume further that the determined offered loads $L_i$ as determined in step 112 for each of the three BTS's are 100, 200, and 300 respectively. Accordingly, using inequalities (5) and as determined in step 114, the resource constraint for each of the three BTS's is as follows:

BTS 1: $0.5x_1 + 0.5x_3 + 0.2x_4 + 0.2x_5 \leq 100$

BTS 2: $0.5x_1 + 0.5x_2 + 0.8x_5 + 0.2x_6 \leq 200$

BTS 3: $0.5x_2 + 0.5x_3 + 0.8x_4 + 0.8x_6 \leq 300$ where $x_j > 0$ for j=1 to 6.

Assume also that the demand targets $e_j$ for each of the six bins and as determined in steps 116 and 118 are 150, 100, 50, 150, 100, and 50 respectively. Accordingly, using weights $w_j = 1$ for all j=1 to 6, the performance functions for each bin and as determined in step 120 are given by equation (7). Using these performance functions to express a lexicographic minimax objective function (i.e., step 122) and coupling this objective function with the above resource constraints, an equitable allocation resource model for the bin offered loads is expressed (i.e., step 124). Solving this model in step 126, the non-uniform spatial offered load for each bin is as shown in Table 2.

TABLE 2

| Bin 1 | $x_1^1 = 100$ |
| Bin 2 | $x_2^1 = 161.111$ |
| Bin 3 | $x_3^1 = 33.333$ |
| Bin 4 | $x_4^1 = 100$ |
| Bin 5 | $x_5^1 = 66.667$ |
| Bin 6 | $x_6^1 = 80.556$ |

Note that this solution satisfies the resource constraints for BTS's 1 and 2 as equality and has an excess of 58.333 of the resource associated with BTS 3.

Comparing each bin's offered load to its demand target, it is seen that bins 1, 3, 4, and 5 have estimated offered loads below the demand target, while bins 2 and 6 have estimated offered loads above the demand targets.

As another example, assume the determined offered loads $L_i$ as determined in step 112 for each of the three BTS's are each 200 at a different time-of-day (the remaining assumptions regarding $p_{ij}$ and $e_j$ are the same as above). Here, the solution to the equitable allocation resource model for the non-uniform spatial offered load for each bin is as shown in Table 3.

TABLE 3

| Bin 1 | $x_1^1 = 144.135$ |
| Bin 2 | $x_2^1 = 85.106$ |
| Bin 3 | $x_3^1 = 42.553$ |
| Bin 4 | $x_4^1 = 127.660$ |
| Bin 5 | $x_5^1 = 96.090$ |
| Bin 6 | $x_6^1 = 42.553$ |

The solution satisfies the resource constraints for BTS's 2 and 3 as equality and has an excess of 61.906 of the resource associated with BTS 1.

Again, comparing each bin's offered load to its demand target it is seen that the estimated offered loads for all six bins are now below their demand targets. Importantly, the solution of our model as formulated by (10a)–(10c) in this second example provides estimated offered loads at the bins that are different from the estimate offered loads of the first example since our model considers the changes in the offered load estimates at each of the BTS's, which are derived from measurements collected at the BTS's. The demand targets, on the other hand, are only rough estimates that may depend, for example, on demographic data and on the sum of offered load estimates over all the BTS's. However, the demand targets are derived without using the information of offered load estimates at specific BTS's.

The above-described embodiments of our invention are intended to be illustrative only. Numerous other embodiments may be devised by those skilled in the art without departing from the spirit and scope of our invention.

We claim:

1. A method for determining an offered load estimate for each of a plurality of bins corresponding to geographic regions of a cellular wireless territory wherein a plurality of base transceiver stations (BTS's) service the territory, said method comprising the steps of:

computing for each of the plurality of bins a probability of each BTS serving a bin, said computing step comprising the probabilities being based on probability distribution function of signal strengths and said probabilities are of the form of equation (1), and solving an equitable resource allocation model to determine the bin offered load estimates based on inputs comprising offered load estimates for each of the plurality of BTS's, demand targets for each of the plurality of bins, and the computed probabilities, the equitable resource allocation model comprising a plurality of resource constraints and an objective function wherein the resource constraints are expressions describing relations between the computed probabilities, the BTS offered load estimates, and the bin offered load estimates and wherein the objective function is an expression describing relations between the bin demand targets and the bin offered load estimates.

2. The method of claim 1 wherein each BTS's offered load estimate is based on the BTS's operating carried load and lost calls.

3. A method for determining an offered load estimate for each of a plurality of bins corresponding to geographic regions of a cellular wireless territory wherein a plurality of base transceiver stations (BTS's) service the territory, said method comprising the steps of:

computing for each of the plurality of bins a probability of each BTS serving a bin, said probability computing step computing the probabilities based on probability function of signal strengths and wherein said probabilities are of the form of equation (3), and solving an equitable resource allocation model to determine the bin offered load estimates based on inputs comprising offered load estimates for each of the plurality of BTS's, demand targets for each of the plurality of bins, and the computed probabilities, the equitable resource allocation model comprising a plurality of resource constraints and an objective function wherein the resource constraints are expressions describing relations between the computed probabilities, the BTS offered load estimates, and the bin offered load estimates and wherein the objective function is an expression describing relations between the bin demand targets and the bin offered load estimates.

4. A method for determining an offered load estimate for each of a plurality of bins corresponding to geographic regions of a cellular wireless territory wherein a plurality of base transceiver stations (BTS's) service the territory, said method comprising the steps of:

computing for each of the plurality of bins a probability of each BTS serving a bin, and solving an equitable resource allocation model to determine the bin offered load estimates based on inputs comprising offered load estimates for each of the plurality of BTS's, demand targets for each of the plurality of bins, and the computed probabilities, the equitable resource allocation model comprising a plurality of resource constraints and an objective function wherein the resource constraints are expressions describing relations between the computed probabilities, the BTS offered load estimates, and the bin offered load estimates and wherein the objective function is an expression describing relations between the bin demand targets and the bin offered load estimates, and wherein each of the plurality of resource constraints corresponds to a BTS and indicates that a computed offered load for that BTS cannot exceed that BTS's estimated offered load wherein the computed offered load is given by equation (4).

5. The method of claim 4, further comprising the steps of:

receiving as inputs relative demand approximations for cellular service at each of the plurality of bins and converting the demand approximations to the demand targets such that the sum of the demand targets for the plurality of bins equals the sum of the BTS offered load estimates for the plurality of BTS's.

6. The method of claim 4 wherein the objective function is a vector of non-increasing performance functions wherein each performance function corresponds to a bin and is a weighted normalized deviation between the bin's demand target and the bin's offered load estimate.

7. The method of claim 4 further comprising the steps of:

using the determined bin offered load estimates to identify bins with relative high offered load estimates, and using the identified bins to improve service to these bins.

8. The method of claim 4 further comprising using the determined bin offered load estimates to perform load balancing among the BTS's.

9. The method of claim 4 wherein said probability computing step computes the probabilities considering that the strongest received BTS signal in a given bin serves a mobile station in that bin in accordance with equation (1) wherein this equation uses the signal strength probability at every bin from every bin.

10. The method of claim 4 wherein said probability computing step computes the probabilities considering that one or more strongest received BTS signals in a given bin serve a mobile station in that bin in accordance with equations (2a), (2b) and (3) wherein these equations use the signal strength probability at every bin from every bin.

11. The method of claim 4 further comprising the step of using the determined bin offered load estimates to determine weights to be used in performing frequency assignment among a plurality of BTS's of a cellular wireless territory.

12. The method of claim 4 wherein said resource constraints are given by equation (5).

13. A method for determining an offered load estimate for each of a plurality of bins corresponding to geographic regions of a cellular wireless territory for an operating cellular wireless system wherein a plurality of base transceiver stations (BTS's) service the territory, said method comprising the steps of computing for each of the plurality of bins a probability of each BTS serving a bin, and:

solving an equitable resource allocation model to determine the bin offered load estimates based on inputs comprising load estimates for each of the plurality of bins, and the computed probabilities, the equitable resource allocations model comprising a plurality of resource constraints and an objective function wherein the resource constraints are expressions describing relations between computed probabilities, the BTS offered load estimates, and the bin offered load estimates and wherein the objective function is an expression describing relations between the bin target demands and the bin offered load estimates, and wherein each determined bin offered load estimate is the solution of the equitable resource allocation model in the form of equations (10a), (10b), and (10c) and which results in a lexicographic smallest vector of performance functions, sorted in a non-increasing order, and satisfies the plurality of resource constraints.

14. A method for determining weights to be used for performing frequency assignment among a plurality of base transceiver stations (BTS's) of a cellular territory, each BTS having an offered load estimate, and wherein the territory is divided into a plurality of logical bins each having a demand target and the plurality of bins further having probabilities of being served by each BTS, said method comprising the steps of:

determining an offered load estimate for each of the plurality of bins by solving an equitable resource allocation model, said equitable allocation resource model comprising a plurality of resource constraints and an objective function, the resource constraints expressing relations between the probabilities of each bin being served by each BTS, the BTS offered load estimates, and the bin offered load estimates and each of the plurality of resource constraints corresponding to a BTS and indicating that a computed offered load can not exceed the BTS's estimated load and wherein the computed offered load is given by equation (4) and the objective functions expressing relations between the bin demand targets and the bin offered load estimates, and using the determined bin offered load estimates as weights to perform frequency assignment among the BTS's.

15. A method for determining weights to be used for performing frequency assignment among a plurality of base transceiver stations (BTS's) of a cellular wireless territory, each BTS having an offered load estimate, and wherein the territory is divided into a plurality of logical bins each having a demand target and the plurality of bins each further having probabilities of being served by each BTS, said method comprising the steps of:

determining an offered load estimate for each of the plurality of bins by solving an equitable resource allocation model, said equitable resource model comprising a plurality of resource constraints and an objective function, the resource constraints expressing relations between the probabilities of each bin being served by each BTS, the BTS offered load estimates, and the bin offered load estimates, and the objective function expressing relations between the bin demand targets and the bin offered estimates, and using the determined bin offered load estimates as weights to perform frequency assignment among the BTS's, and wherein the objective function is a lexicographic minimax objective function of a vector of performance functions wherein each performance function corresponds to a bin and is a weighted normalized deviation between the bin's demand target and the bin's offered load estimate and wherein the determined bin offered load estimates simultaneously produce the lexicographic smallest vector of performance functions sorted in non-increasing order and satisfy the plurality of resource constraints.

* * * * *